United States Patent [19]

Garabedian

[11] 4,104,101

[45] Aug. 1, 1978

[54] PROCESS FOR MAKING A PLASTIC SHEET

[76] Inventor: Armen Garabedian, 8-22 Astoria Blvd., Long Island City, N.Y. 11102

[21] Appl. No.: 817,048

[22] Filed: Jul. 19, 1977

Related U.S. Application Data

[60] Continuation of Ser. No. 279,964, Aug. 11, 1972, abandoned, which is a continuation-in-part of Ser. No. 141,495, May 10, 1971, abandoned, which is a division of Ser. No. 805,093, Feb. 14, 1969, abandoned, which is a continuation of Ser. No. 536,140, Mar. 21, 1966, abandoned, which is a continuation-in-part of Ser. No. 473,342, Jul. 20, 1965, Pat. No. 3,383,265.

[51] Int. Cl.$^2$ .............................................. B29C 17/06
[52] U.S. Cl. ..................................... 156/285; 156/286; 156/289; 156/323; 264/88; 264/90; 264/109
[58] Field of Search ............... 156/245, 246, 247, 276, 156/285, 286, 289, 323; 264/88, 89, 90, 93, 102, 109, 112, DIG. 53, DIG. 78; 100/93 R, 93 P, 211, 295, 269, 296; 65/18, 24, 60, 144, 156, 182 R, 318, 319

[56] References Cited

U.S. PATENT DOCUMENTS

| | | | |
|---|---|---|---|
| Re. 23,572 | 11/1952 | Curran et al. ................. | 156/285 |
| 635,917 | 10/1899 | Church ........................ | 156/285 |
| 1,190,072 | 7/1916 | Aiken ......................... | 156/285 |
| 1,725,454 | 8/1929 | Heyl .......................... | 156/285 |
| 1,884,529 | 10/1932 | Benner et al. ................ | 156/285 |
| 1,909,444 | 5/1933 | Worall ........................ | 156/382 |
| 2,196,577 | 4/1940 | Currie et al. ................. | 156/285 |
| 2,268,477 | 12/1941 | Elmendorf ................... | 144/309 |
| 2,363,107 | 11/1944 | Young ........................ | 156/285 |
| 2,367,779 | 1/1945 | Hull .......................... | 156/382 |
| 2,447,415 | 8/1948 | Lyon ......................... | 156/382 |
| 2,456,093 | 12/1948 | Swedlow ..................... | 156/285 |
| 2,459,295 | 1/1949 | Shoog ........................ | 156/382 |
| 2,467,322 | 4/1949 | Lightboun et al. ............ | 156/338 |
| 2,468,629 | 4/1949 | Herzig et al. ................ | 156/157 |
| 2,480,851 | 9/1949 | Goss .......................... | 156/285 |
| 2,524,932 | 10/1950 | Schulman .................... | 156/323 |
| 2,565,949 | 8/1951 | Clifford et al. ............... | 156/382 |
| 2,654,901 | 10/1953 | Morrison ..................... | 156/285 |
| 2,698,273 | 12/1954 | Miner et al. .................. | 156/285 |
| 2,711,985 | 6/1955 | Olson ......................... | 156/285 |
| 2,731,654 | 1/1956 | Nowak ....................... | 12/147 R |
| 2,743,761 | 5/1956 | Snyder et al. ................ | 156/272 |
| 2,751,321 | 6/1956 | Sans .......................... | 156/304 |
| 2,794,940 | 6/1957 | Roup ......................... | 317/101 |
| 2,833,686 | 5/1958 | Sandt ........................ | 156/313 |
| 2,851,730 | 9/1958 | Wilhelmi et al. ............. | 264/112 |
| 2,911,678 | 11/1959 | Brunfeldt ................... | 264/109 |
| 2,929,109 | 3/1960 | Cresap ....................... | 264/109 |
| 2,936,261 | 5/1960 | Cole .......................... | 156/272 |
| 2,960,147 | 11/1960 | Ferrell ....................... | 156/382 |
| 2,960,425 | 11/1960 | Sherman ..................... | 156/304 |
| 2,965,527 | 12/1960 | Morris ........................ | 156/99 |
| 2,978,008 | 4/1961 | Conti ......................... | 156/272 |
| 3,067,507 | 12/1962 | Titus .......................... | 29/471.1 |
| 3,090,717 | 5/1963 | Raczynski et al. ............ | 156/272 |
| 3,130,101 | 4/1964 | Gittins et al. ................ | 156/163 |
| 3,146,143 | 8/1964 | Bolesky et al. ............... | 156/212 |
| 3,158,089 | 11/1964 | Fillol ......................... | 100/244 |
| 3,202,745 | 8/1965 | Ringdal ...................... | 264/113 |
| 3,228,330 | 1/1966 | Myers ........................ | 101/401.1 |
| 3,247,041 | 4/1966 | Henderson .................. | 156/272 |
| 3,297,805 | 1/1967 | Rottig et al. ................. | 264/126 |
| 3,383,265 | 5/1968 | Garabedian ................. | 156/272 |
| 3,493,451 | 2/1970 | Beery ........................ | 156/219 |
| 3,551,541 | 12/1970 | Rossetti ...................... | 264/102 |
| 3,686,383 | 8/1972 | Makinen ..................... | 264/120 |
| 3,694,129 | 9/1972 | Daddona ..................... | 425/405 |
| 3,769,133 | 10/1973 | Halberschmidt et al. ...... | 156/286 |

FOREIGN PATENT DOCUMENTS

| | | |
|---|---|---|
| 678,203 | 1/1964 | Canada. |
| 1,112,894 | 8/1961 | Fed. Rep. of Germany. |
| 369,028 | 3/1932 | United Kingdom. |
| 822,609 | 10/1959 | United Kingdom. |
| 1,022,156 | 3/1966 | United Kingdom. |
| 1,039,898 | 8/1966 | United Kingdom. |
| 1,045,279 | 10/1966 | United Kingdom. |

*Primary Examiner*—Caleb Weston
*Attorney, Agent, or Firm*—Pennie & Edmonds

[57] ABSTRACT

In a process for producing plastics sheet or film having a face which conforms to a face of a master, e.g. a ground glass surface, comminuted plastics material is placed in a layer on the master and a parting sheet is placed over the plastics material. Force is applied evenly over all of the area of the plastics layer, e.g. as by fluid pressure through a diaphragm, and the plastics material is heated to its fusion temperature such that the plastics materials flows into a coherent sheet or film. Relatively low fluid pressures, e.g. atmospheric and less, may be used. In a further step, the flat face of plastics sheet or film formed in this way is metallized and then covered with an abrasion resistant transparent coating, to result in a high quality mirror. In a preferred process, the transparent coating is cured rapidly by application of radiant heat.

34 Claims, 3 Drawing Figures

PROCESS FOR MAKING A PLASTIC SHEET

This application is a continuation of Ser. No. 279,964 filed Aug. 11, 1972, abandoned, which is a continuation-in-part of Ser. No. 141,495 filed May 10, 1971, abandoned, which is a division of Ser. No. 805,093 filed Feb. 14, 1969, abandoned, which is a continuation of Ser. No. 536,140 filed Mar. 21, 1966, abandoned, which is a continuation-in-part of Ser. No. 473,342, filed July 20, 1965, U.S. Pat. No. 3,383,265.

This invention relates to the making of plastics film and sheet, and is particularly applicable to the production of such film and sheet material having surface characteristics of a "master", for example, very flat surfaces suitable for the making of mirrors.

Until now, the best quality of film or sheet plastics material produced from pelletized or ground plastics powder has been made by the compression method, but such method is in practice so costly as to rule itself out of the market except for very special applications. Not only is the capital equipment itself costly, but the carrying out of the process steps is also uneconomic. The pressures required may reach many thousands of pounds per square inch, and for example those recommended for producing polystyrene homopolymer sheet are from 1,000 to 10,000 p.s.i., whereas for acrylics they are of the order of 2,000 to 5,000 p.s.i.

It is accordingly a first object of the invention to provide an improved process requiring pressures which may well be as low as 50 p.s.i. and under, even to the extent of permitting use of only that force generated by differential of atmospheric pressure and partial vacuum, and which may be carried out with capital equipment of a fraction of the cost of that required for the above-mentioned compression process.

A second object of the invention is to provide improved apparatus suitable for use in carrying out the steps of said process.

A third object is to provide a process for the production of mirror surfaces of extremely high quality, utilising plastic sheet produced in accordance with said process.

According to a first aspect of the present invention a process for producing a plastics sheet having at a major face the surface characteristics of a master, e.g. extreme polish and flatness or a pattern or engraved design or the like, comprises the steps of disposing on the master a layer of plastics material in comminuted state, disposing over said layer a porous parting element, heating said plastics material to at least its fusion temperature, usually of the order of about 400° F, and applying evenly across the sandwich, composed of the master plus the plastics material plus the parting element, a force sufficient to cause the plastics material to fuse to a coherent sheet.

In a first manner of operation, the force applied to the sandwich is fluid pressure exerted through a flexible diaphragm, and in a preferred embodiment the fluid pressure is exerted equally and oppositely on both major faces of the sandwich through respective flexible diaphragms disposed one against each major face of the sandwich. For example, the sandwich may be disposed between the diaphragms, and the diaphragms then caused to seal together in fluid-tight manner peripherally about the sandwich so as to define a chamber, fluid being evacuated from said chamber so as to cause the flexible diaphragms to be urged against the sandwich by atmospheric pressure.

In another manner of operation, the sandwich is disposed between two fixed spaced platens, with a flexible chamber situated between at least one of said platens and the sandwich, whereafter fluid under superatmospheric pressure is then applied to the, or each, chamber to compress the sandwich between the chambers, or between one chamber and the opposed platen.

In yet another manner of operation the sandwich is disposed between two platens of variable spacing with flexible chambers situated between the platens and the sandwich. With the platens at an initial greater degree of spacing, fluid pressure is applied to each chamber to inflate or balloon them. The platens are thereafter moved towards each other to compress each chamber and the sandwich.

The parting element may be a thin minutely-porous sheet such as polytetrafluoroethylene-impregnated glass fabric, and over this to release air may be placed a wire cloth or screen, or again the air release screen may be of minutely perforated thin metal.

The layer of plastics material may contain two or more plastics of different characteristics, such as colour or composition, which may be intermingled or arranged in layers to form a laminate.

Whilst polystyrene and methyl methacrylate or acrylics are shown herein as examples, many other plastics including polyehylenes and polypropylenes may be similary used. Dissimilar plastics such as polystyrenes and polyvinlchlorides may be mixed or superimposed in one or more layers.

During the step of applying fluid pressure to the heated plastics material, all areas of the plastics material are contacted with even pressure. Any air and moisture initially present in the plastics material is exhausted as the heating permeates through it. As the plastics material melts and consolidates the only movement is that towards solidifying. If the sheet is being produced on a glass plate, in lieu of the usual metal, the fluid pressures applied do not result in any uneven application of force liable to cause breakage.

The coherent plastics sheet produced in accordance with the process of the invention may be utilised for the production of mirror surfaces of very high quality. The master could be a metal or glass element having a ground face of extreme polish. Onto that face of the coherent plastics sheet, to which this polish is imparted, there is applied a layer of reflective metal, for example sprayed silver, and a transparent abrasionresistant coating is applied over the metal layer. In a preferred method, a solution of glass resin polymer is applied as a coating over said metal layer, and radiant heat is directed onto said coating to cure it. By way of practical example, the coherent plastics sheet may be a polystyrene homopolymer of about .09 inches thickness with a layer of silver sprayed onto the polished surface, the abrasion resistant coating being a film of 40% Glass Resin with 5% A-1100 (Union Carbide) catalyst in solution in butanol, and cured by the application of radiant heat.

Other objects, features, and advantages of the invention will be apparent from the following description with reference to the accompanying drawings, wherein.

Figure 1:
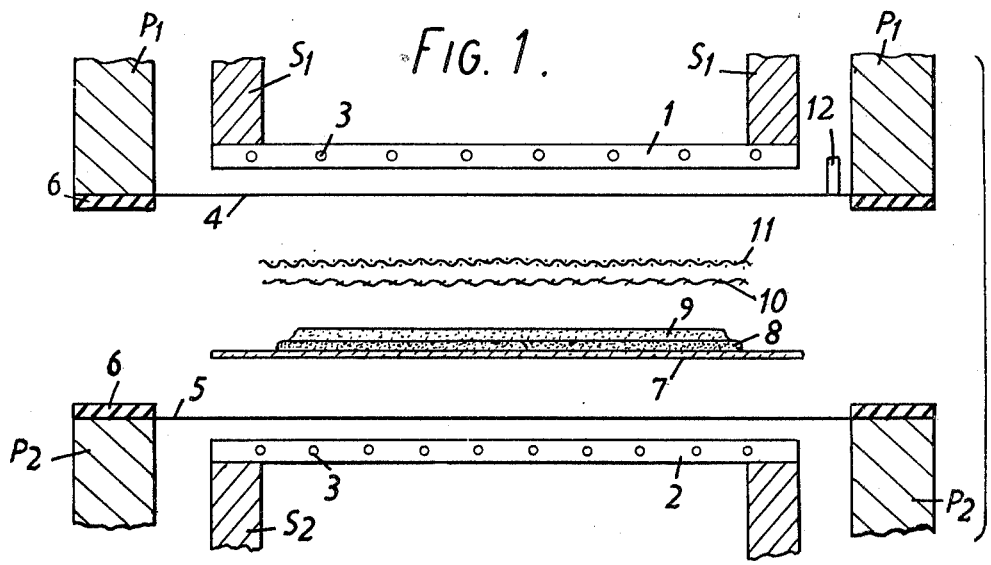
FIG. 1 is a schematic vertical section of a first embodiment of apparatus, in which use is made of exhaustion of air to obtain application of force by atmospheric air pressure.

Referring to FIG. 1, the apparatus comprises support members S1 and S2 movable towards and away from each other, and a top platen 1 and a bottom platen 2 carried on the support members. Both platens contain heating cores 3 such as electrical resistance heaters in order to supply heat only and no pressure. Between the platens 1 and 2 there are disposed a top diaphragm 4 and a bottom diaphragm 5, each having a peripheral gasket 6 made of a suitable resiliently compressible sealing medium such as rubber. The gaskets 6 are preferably spaced laterally sufficiently from the platens 1 and 2 so as not to be affected detrimentally by their heat. The gaskets 6 can be forced into contact by pressure members P1 and P2, which may form part of the jaws of a press also incorporating the supports S1 and S2.

Between the diaphragms is disposed a pattern or master whose surface characteristics it is desired to reproduce on the plastics sheet to be formed. This master may be for example, a sheet 7 of glass.

On the master sheet 7 there is placed powdered plastics material suitable for formation of the desired plastics sheet. This may take the form of, for example, an acrylic powder layer 8 of one or more colours or other different plastics over different zones. A second layer 9 is of the same or one or more different plastics and of the same or one or more different colours.

Above the powder layers 8, 9 there is disposed a sheet 10, of porous parting agent, for example a polytetrafluoroethylene-coated glass fabric containing many minute pinholes. For air or gas release there is advantageously also provided a sheet 11 of wire cloth.

In the top diaphragm 4 there is provided a pipe connection 12 for attachment to an exhausting apparatus (not shown).

In operation, the platens 1, 2 and diaphragms 4, 5 are moved together so as to bring them and the glass sheet 7, powder layers 8, 9 and parting sheet 10, 11 into contact, and so as to cause the gaskets 6, 6 to seal in fluid-tight manner to each other. Then air is exhausted, through the pipe connection 12, from the chamber defined by the diaphragms 4, 5 and the gaskets 6, 6. In this way, the differential atmospheric air pressure acting on the diaphragms 4, 5 is the only pressure used and applies fluid pressure evenly over the whole area of the powder layers 8, 9, on the glass sheet 7. The gaskets 6 are kept closed, and the evacuation maintained, long enough for heat from platens 1 and 2 to pass through into the plastics layers 8, 9 for them to be softened and flow into a coherent sheet form. Then the suction at pipe connection 12 is discontinued, the apparatus opened, and the master 7 and finished plastics sheet thereon removed.

Figure 2:
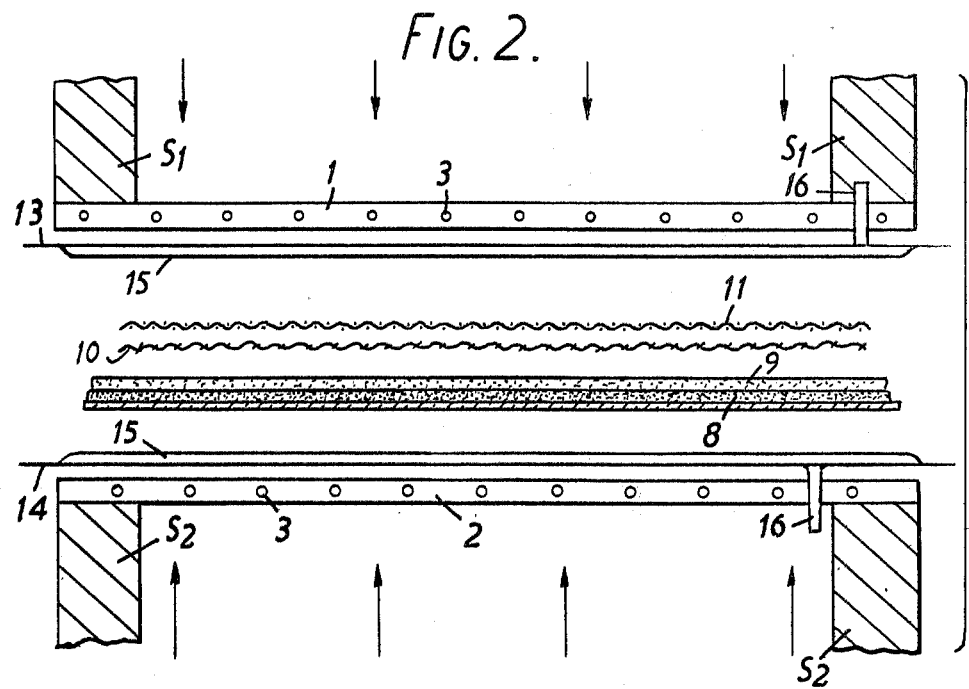
FIG. 2 is a schematic vertical section of a second embodiment of apparatus, in which use is made of application of super-atmospheric fluid pressure to obtain application of force.

Referring now to FIG. 2, there is shown another embodiment of apparatus in which the support members S1 and S2, the top platen 1, bottom platen 2, heating cores 3, glass master sheet 7, plastics layers 8, 9 and parting sheet 10 and an escape screen 11 are substantially as described in relation to FIG. 1. However, the diaphragms 4, 5 of FIG. 1 are here replaced by a top fluid pressure element 13 and a similar bottom pressure element 14, each of which has an internal fluid space 15 and is provided with a pipe connection 16 connected to a source of pressure fluid (not shown). In this construction, it is essential that the top platen 1 and the bottom platen 2 be pressure applying or holding when in their closed position, by a suitably strong structure, such as the support members S1 and S2 of a press. When the press has been closed, to bring the items into surface to surface contact, fluid pressure is applied through the pipe connections 16, to each of the spaces 15, 15. The spaces 15 cover the entire area of the sheet to be produced, and fluid pressure is applied evenly over the entire area. The press is kept closed, and the fluid pressure applied, for as long as is necessary to obatin heating, melting, and flowing of the powdered plastics materials into a homogeneous sheet. Then the fluid pressure is removed, the press opened, and the formed plastics sheet removed. The fluid pressure applied may be, for example, from about 50 p.s.i. to below about 10 p.s.i.

The pressure elements 13, 14 with their pipe connections 16, may be used with conventional compression presses, with fluid of comparable p.s.i. required. In an alternative method of operation, the fluid pressure may be applied to the elements 13, 14 with the support members S1 and S2 of the press still wholly or partially open, to cause the elements 13, 14 to balloon outwardly at, say, about 1 p.s.i. or less. Then the pipe connections 12 are closed off, and the press operated to cause the platens 1, 2 to close together, the requisite further pressure being applied by the press itself, e.g. with the usual hydraulic or fluid rams.

In all cases, any air or gas which might tend to become trapped within the powder layers 8, 9 to cause air or gas pockets in the eventual formed plastics sheet, passes outwardly through the porous parting sheet 10 and its wire air escape 11. The same applies to any moisture which may be present initially in the powdered plastics.

The diaphragms 4 and 5 of FIG. 1, and the elements 15 of FIG. 2, may be made of any sheet material capable of standing up to the required temperature without becoming perforated. I have used successfully copper sheet of 0.005 inches thickness, and stainless steel of the 400 series of 0.075 inches thickness.

The coherent plastics sheet produced in accordance with the invention has surfaces which are equal to the best which can be produced in glass. The sheet has zero stress, and often zero de-grading, both of which are valuable factors in regard to outdoor weathering, resistance to ultraviolet degrading, and in heat-forming. Moisture which may be present initially in the comminuted plastics material, and which is normally a great problem in the use of such material, disappers during the process. The process may be used not only for the production of extremely flat surfaces, but also for reproducing etched and other surface formations provided on glass in lieu of metal, thereby greatly extending the range of surfaces which can be reproduced.

Because very smooth surfaces, e.g. the finest of polished glass surfaces, can be duplicated, it is possible in accordance with the invention to produce mirrors with a reflectivity which is much superior to the usual glass. The zero stress and lack of degrading of the plastics, referred to above, are helpful in this regard, and there is obtained an increased strength of bonding of the plating which is superior to that obtained with glass, and provides strikingly better reflectivity. It is advantageous that such surfaces should contain no release agents at all, or that such agents should be properly cleaned off.

No treatments such as chemical etching or corona are needed. I have found that silver spray plating is very efficient and economical, and a preferred procedure is to apply as follows:
(a) water rinsing of the finger-print free surface
(b) a sensitizing spray
(c) a water rinse
(d) an evenly sprayed silver solution
(e) a thorough water rinse.

All of the above steps may be performed readily in less than 5 minutes.

I have found that first surface mirrors are preferable to the second surface mirros usual with glass. In first surfaces, the silver plating must be covered with an abrasionresistant coating, for example of the acrylic kind and preferably sprayed on.

A preferred material is the class of glass resin polymers described in United States Patent Specification No.3,451,838 of Owens-Illinois, Inc. These polymers cure to an abrasion-resistant glass-like hard thermoset material which is insoluble in most common solvents and is highly light-transmitting above about 1900A° and non-yellowing. I have found as best the Glass Resin Type 650 as sold by that Company, with which thickness under 0.001 inch are adequate. A 40% solution in butanol can be used with about 5% of the A-1100 type catalyst supplied by Union Carbide Co. However, the recommended cure time of 16 to 24 hours at 275° F. is uneconomically long, and that temperature is excessive for a polystyrene homopolymer mirror sheet, of 0.090 inches thickness, that melts at about 290° F. This time-temperature-thickness relationship can be modified such that the time can be cut to less than about 6 minutes. To do this I use radiant heat evently applied from above. This radiation strikes the silver plating, which reflects well over 90%. The glass resin coated silver plated side heats very quickly, and the other side very slowly. A temperature of 400° F. is reached very rapidly, and a cure is effected at this temperature in about two minutes, i.e. long before there is harm to the sheet.

Figure 3:
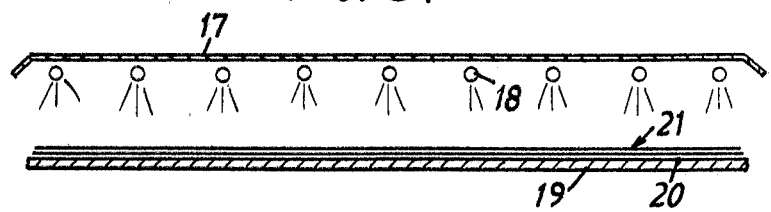
FIG. 3 is a schematic side elevation illustrating the curing of an abrasion-resistant coating applied to a plastics sheet produced in accordance with the invention.

Referring now to FIG. 3, there is shown a highly reflective stainless steel heating panel 17 having a plurality of radiant heating coils 18. A polystyrene homopolymer sheet 19, produced by the method described in relation to FIG. 1 or FIG. 2, and of 0.090 inches thickness, has a silver plate layer 20 and a film coating 21 of 5% A-1100 catalyst in a 40% Glass Resin dissolved in butanol.

In operation, the coated surface 21 heats up very rapidly, requiring the heating to be advantageously cut down, e.g. by a variable transformer, to prevent the temperature going much over 400° F. Less than about 6 minutes usually suffices for completion of the operation, with thicknesses below about 0.001 inch.

Mirrors produced in accordance with this process appear, to a lay observer, to have a greatly magnifying effect which is due in practice to the absence of the about 10 to 15% light loss which is common to glass mirrors.

The same method may be used on various plastics, with or without the silver plating later. Special coatings may be applied e.g. with plastics or other materials incorporating infra-red absorbers. Cross-linked materials, such as polyesters and epoxy sheeting may also be similarly treated.

I claim:

1. The process for producing a plastic sheet having on a major face thereof the characteristics of one surface of a master layer, comprising the steps of disposing on said surface of said master layer a plastic material in comminuted form, disposing over said plastic material a micro-porous parting element and an air-releasing wire screen means to form a multiple layer sandwich which includes said wire screen means, said parting element, said plastic material, and said master layer, positioning said multiple layer sandwich between two spaced flexible diaphragms, heating said plastic material to at least its fusion temperature, applying a fluid pressure to said diaphragms to evenly impress a fluid-like pressure to said multiple layer sandwich with a force sufficient to cause the plastic material to fuse to a coherent mass defining a plastic sheet as said major face takes on the characteristics of said one surface of the juxtaposed master layer.

2. The method of claim 1 in which the step of applying a fluid pressure includes sealing the periphery of said two flexible disphragms together and evacuating the space between said diaphragms and within said sealed periphery.

3. The method of claim 2 including the step of backing said diaphragms with platens.

4. The method of claim 3 including the step of heating said platens.

5. The method of claim 1 in which each of said diaphragms is one face of a sealed pressure element and in which said step of applying pressure includes applying fluid pressure to the space within said pressure elements.

6. The method of claim 5 including the step of backing said diaphragms with platens.

7. The method of claim 6 including the step of heating said platens.

8. The process for producing a plastic sheet having on a major face thereof the characteristic of one surface of a master layer, comprising the steps of disposing on said surface of said master layer a plastic material in comminuted form; disposing over said plastic material a micro-porous parting element and an air-releasing wire screen means to form a multiple layer sandwich which includes said wire screen means, said parting element, said plastic material, and said master layer; positioning said multiple layer sandwich between two spaced flexible diaphragms; sealing said diaphragms in a fluid tight manner about the periphery of said multiple layer sandwich to define a sealed chamber in which said multiple layer sandwich is disposed; evacuating said sealed chamber; and heating said plastic material to at least its fusion temperature, said evacuation of said sealed chamber causing said diaphragms to be urged against said multiple layer sandwich by atmospheric pressure to thereby evenly impress a fluid-like pressure to said multiple layer sandwich with a force sufficient to cause the plastic material to fuse to a coherent mass defining a plastic sheet as said major face takes on the characteristics of said one surface of the juxtaposed master layer.

9. The process according to claim 8 wherein said flexible diaphragms are made of metal.

10. The process according to claim 8 wherein said master layer is made of glass.

11. The process according to claim 8 wherein said micro-porous parting element includes a glass fabric coated with polytetrafluoroethylene.

12. The process according to claim 8 in combination with the further steps of applying to said plastic sheet a surface plating layer of reflective metal and applying over said metal layer a transparent abrasion-resistant coating.

13. The process according to claim 12 wherein said coating is a glass resin polymer, and directing radiant heat onto said coating to cure the latter.

14. The process for producing a plastic sheet having on a major face thereof the characteristics of one surface of a master layer, comprising the steps of disposing on said surface of said master layer a plastic material in comminuted form; disposing over said plastic material a micro-porous parting element and an air-releasing wire screen means to form a multiple layer sandwich which includes said wire screen means, said parting element, said plastic material, and said master layer; positioning said multiple layer sandwich between two spaced flexible diaphragms and two spaced platens; disposing said flexible diaphragms between said spaced platens and said multiple layer sandwich; heating said plastic material to at least its fusion temperature; and applying a positive fluid pressure above atmospheric to said diaphragms to evenly impress a fluid-like pressure to said multiple layer sandwich with a force sufficient to cause the plastic material to fuse to a coherent mass defining a plastic sheet as said major face takes on the characteristics of said one surface of the juxtaposed master layer.

15. The process according to claim 14 including the steps of applying said positive pressure to said flexible diaphragms when said spaced platens are at one spaced disposition, and subsequently moving said spaced platens closer to one another to thereby compress said chamber and the multiple layer sandwich disposed in said chamber.

16. The process according to claim 14 wherein said flexible diaphragm is made of metal.

17. The process according to claim 14 wherein said master layer is made of glass.

18. The process according to claim 14 wherein said micro-porous parting agent means includes a glass fabric coated with polytetrafluoroethylene.

19. The process according to claim 14 in combination with the further steps of applying to said plastic sheet a surface plating layer of reflective metal, and applying over said metal layer a transparent abrasion-resistant coating.

20. The process according to claim 19 wherein said coating is a glass resins polymer, and directing radiant heat onto said coating to cure the latter.

21. The process for producing a plastic sheet having on a major face thereof the characteristics of one surface of a master layer, comprising the steps of disposing on said surface of said master layer a plastic material in comminuted form, disposing over said plastic material a microporous parting element and an air-releasing wire screen means to form a multiple layer sandwich which includes said wire screen means, said parting element, said plastic material, and said master layer; positioning said multiple layer sandwich beneath a flexible diaphragm, heating said plastic material to at least its fusion temperature, applying a fluid pressure to said diaphragm to evenly impress a fluid-like pressure to said multiple layer sandwich with a force sufficient to cause the plastic material to fuse to a coherent mass defining a plastic sheet as said major face takes on the characteristics of said one surface of the juxtaposed master layer.

22. The method of claim 21 including the step of heating said platen.

23. The method of claim 21 in which the step of applying a fluid pressure includes sealing the periphery of said diaphragm against the passage of air and evacuating the space within said sealed periphery.

24. The method of claim 23 including the step of backing said diaphragm with a platen.

25. The method of claim 21 in which said diaphragm is one face of a sealed pressure element and in which said step of applying pressure includes applying fluid pressure to the space within said pressure element.

26. The method of claim 25 including the step of backing said diaphragm with a platen.

27. The method of claim 26 including the step of heating said platen.

28. The method of claim 27 including also positioning said multiple layer sandwich over a second heated platen.

29. The process for producing a plastic sheet having on a major face thereof the characteristic of one surface of a master layer, comprising the steps of disposing on said surface of said master layer a plastic material in comminuted form; disposing over said plastic material a micro-porous parting element and an air-releasing wire screen means to form a multiple layer sandwich which includes said wire screen means, said parting element, said plastic material, and said master layer; positioning said multiple layer sandwich beneath a flexible diaphragm; sealing said diaphragm in a fluid tight manner about the periphery of said multiple layer sandwich to define a sealed chamber in which said multiple layer sandwich is disposed; evacuating said sealed chamber; and heating said plastic material to at least its fusion temperature, said evacuation of said sealed chamber causing said diaphragm to be urged against said multiple layer sandwich by atmospheric pressure to thereby evenly impress a fluid-like pressure to said multiple layer sandwich with a force sufficient to cause the plastic material to fuse to a coherent mass defining a plastic sheet as said major face takes on the characteristics of said one surface of the juxtaposed master layer.

30. The process according to claim 29 wherein said flexible diaphragm is made of metal.

31. The process according to claim 29 wherein said master layer is made of glass.

32. The process according to claim 29 wherein said micro-porous parting element includes a glass fabric coated with polytetrafluoroethylene.

33. The process according to claim 29 in combination with the further steps of applying to said plastic sheet a surface plating layer of reflective metal and applying over said metal layer a transparent abrasion-resistant coating.

34. The process according to claim 33 wherein said coating is a glass resin polymer, and directing radiant heat onto said coating to cure the latter.

* * * * *

UNITED STATES PATENT AND TRADEMARK OFFICE
CERTIFICATE OF CORRECTION

PATENT NO. : 4,104,101
DATED : August 1, 1978
INVENTOR(S) : Armen Garabedian

It is certified that error appears in the above-identified patent and that said Letters Patent are hereby corrected as shown below:

Column 4, line 33, "wire air escape 11" should read -- air escape wire screen 11 --.

Column 4, line 41, "0.075" should read -- 0.0075 --.

Column 5, line 59, "later" should read -- layer --.

Column 7, line 44, "resins" should read -- resin --.

Signed and Sealed this

Thirtieth Day of January 1979

[SEAL]

Attest:

RUTH C. MASON
Attesting Officer

DONALD W. BANNER
Commissioner of Patents and Trademarks